J. W. MILLER & B. COLL.
Sheet-Metal Can.

No. 207,058.    Patented Aug. 13, 1878.

WITNESSES:
W. W. Hollingsworth
Edw. W. Byrn.

INVENTOR:
Jos. W. Miller
Bernard Coll
BY
ATTORNEYS.

UNITED STATES PATENT OFFICE.

JOSEPH W. MILLER AND BERNARD COLL, OF BALTIMORE, MARYLAND.

IMPROVEMENT IN SHEET-METAL CANS.

Specification forming part of Letters Patent No. 207,058, dated August 13, 1878; application filed July 16, 1877.

*To all whom it may concern:*

Be it known that we, JOSEPH W. MILLER and BERNARD COLL, of Baltimore city, State of Maryland, have invented a new and Improved Sheet-Metal Can; and we do hereby declare that the following is a full, clear, and exact description of the same, reference being had to the accompanying drawing, forming part of this specification, in which—

Figure 1:
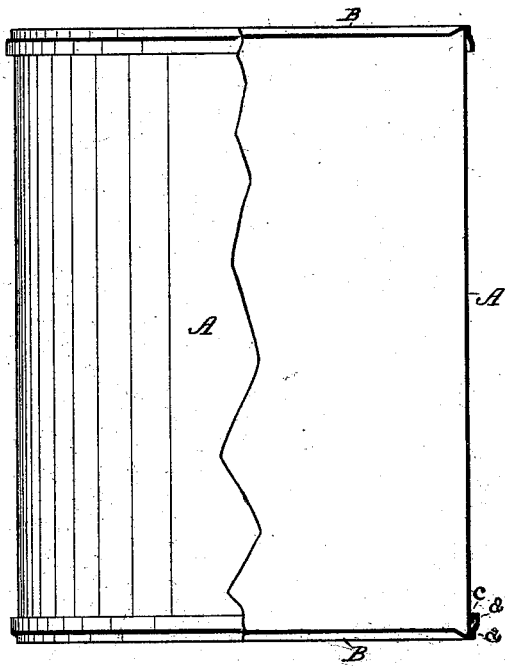
Figure 2:
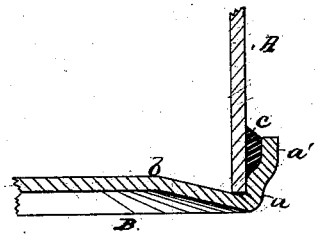

Figure 1 is a side view of the can with one-half in section. Fig. 2 is an enlarged sectional view, showing the character of the joint between the heads and the body portion.

Our invention relates to an improvement in that form of sheet-metal cans whose joints are tightly closed and hermetically sealed by means of solder.

The improvement consists in stamping the heads of the can with a flange, which is bent, in relation to the cylindrical body portion, first parallel with the same, then flared outwardly, and again bent parallel, so that when the said body portion, which is made straight from end to end, is fitted to the heads the edge of the body portion binds tightly with the inner edge of the smaller portion of the flange, while the outer edge of the flange sets off from the body of the can sufficiently to permit the solder to run in and form a tight joint, as hereinafter more fully described.

In the drawing, A represents the cylindrical body portion, and B B the two circular heads of a sheet-metal can constructed in accordance with our invention.

The body portion of the can is made straight from end to end, and the heads are struck up in dies to form a peculiar flange, $a\ a'$, the inner portion, $a$, of which flange is of less diameter than the outer or marginal portion, $a'$. In fitting the heads to the body of the can the portion $a$ of the flange extends up parallel with and binds tightly against the ends of said body, while the outer marginal and larger portion, $a'$, of the flange sets off a slight distance to receive the solder. In soldering said heads, they are first fitted to the body portion, and the solder run into the slight annular space between the flange $a'$ and the body, as shown at $c$, by a dipping process, the can being depressed into an annular trough of melted solder, which then runs into said annular space to form a very strong and tight joint.

The advantages of a can constructed with this form of joint are as follows: The smaller portion $a$ of the flange, by binding tightly with the ends of the body, holds the latter in concentric relation to the outer portion, $a'$, of the flange, and thus makes the annular space for the solder uniform all around the can. The offsetting portion $a'$ of the flange makes, also, a trough to receive and hold the solder, so that when the solder has hardened the head is held to the body portion by a large adhering-surface, the solder being prevented from passing into the can to any great extent by the close fit between the end of the body portion and the part $a$ of the flange. The head being soldered to the can well up on the side of the same, the head is not liable to leak at the joints from any battering which it may receive upon its ends. The outer edge of the flange being of considerably larger diameter than the body of the can, the end of the said body portion is easily fitted to the heads, the curve of the flange guiding the body portion snugly to its tight position beside the portion $a$ of the flange.

In stamping the heads of the cans they are preferably dished, as at $b$; but we may make them plain, if desired.

We are aware of the fact that cans have been heretofore constructed with joints having a degree of similarity to ours, reference being had, by way of example, to that shown in Patent No. 183,507, in which both the edge of the body portion and the heads are beaded, while the edge of the head is flared outwardly at an angle to form a V-groove for solder. We therefore limit our invention to the can constructed as shown and described, which is distinctive in the following features: The body portion is straight from end to end. The portion of the flange near the ends of the body portion is of less diameter than the edge or marginal portion, and binds tightly with the straight body portion, and the portion of the flange having the greatest diameter is arranged parallel with the side of the can in forming the trough to receive the solder.

This construction and arrangement of the parts of the can permit it to be easily and cheaply made, the heads being struck up in dies, and the peculiar form of flange securing, in connection with the solder, a strong joint and good finish.

Having thus described our invention, what we claim as new is—

As a new article of manufacture, a sheet-metal can constructed of a body portion straight from end to end, combined with heads, flanged as described—i. e., with the portion $a$ of the flange of less diameter than the marginal portion, and binding closely against the straight side of the can, and the portion $a'$ of greater diameter than $a$, and setting off from the body of the can in parallel position therewith, as shown and described.

JOS. W. MILLER.
BERNARD + COLL.
his mark.

Witnesses:
SOLON C. KEMON,
JNO. P. LOTHROP.